(12) United States Patent
Howard

(10) Patent No.: US 6,622,513 B1
(45) Date of Patent: Sep. 23, 2003

(54) FREEZE-CRUSTING PROCESS AND APPARATUS

(76) Inventor: David Howard, 2403 E. 25th Pl., Tulsa, OK (US) 74114-3215

(*) Notice: Subject to any disclaimer, the term of this patent is extended or adjusted under 35 U.S.C. 154(b) by 250 days.

(21) Appl. No.: 09/748,646

(22) Filed: Dec. 21, 2000

(51) Int. Cl.[7] .............................................. F25D 25/04
(52) U.S. Cl. ........................................ 62/380; 198/801
(58) Field of Search ..................... 62/63, 380; 425/524; 198/801; 211/121

(56) References Cited

U.S. PATENT DOCUMENTS

| | | | | |
|---|---|---|---|---|
| 1,907,649 A | * | 5/1933 | Marx ............................. 62/60 |
| 2,442,070 A | * | 5/1948 | Bouchard ................... 108/149 |
| 2,774,460 A | * | 12/1956 | Spoonhour ............... 198/484.1 |
| 3,258,109 A | * | 6/1966 | Breitenstein ................ 198/801 |
| 3,268,055 A | * | 8/1966 | Stein et al. ............. 198/457.03 |
| 3,296,812 A | * | 1/1967 | Cloudy ........................... 62/63 |
| 4,345,682 A | * | 8/1982 | White et al. ................ 198/635 |
| 5,186,310 A | * | 2/1993 | Winchester ............... 198/626.5 |
| 5,205,135 A | * | 4/1993 | Lang ............................. 62/381 |
| 5,520,013 A | * | 5/1996 | Kuo ............................... 62/380 |
| 5,533,343 A | * | 7/1996 | Moshier et al. .............. 62/63 |
| 5,809,787 A | * | 9/1998 | Zittel ............................. 62/63 |
| 5,966,962 A | * | 10/1999 | Murray et al. ................ 62/374 |
| 6,009,719 A | * | 1/2000 | Ochs ............................. 62/380 |
| 6,073,540 A | * | 6/2000 | Garrett ........................ 99/330 |
| 6,148,618 A | * | 11/2000 | Malmberg et al. ............. 62/63 |
| 6,167,708 B1 | * | 1/2001 | Cloarec ......................... 62/63 |

* cited by examiner

Primary Examiner—William E. Tapolcai
Assistant Examiner—Mohammad M. Ali
(74) Attorney, Agent, or Firm—Fellers, Snider, Blankenship, Bailey & Tippens, P.C.

(57) ABSTRACT

A freeze-crusting process and a vertical freezing apparatus preferred for use in the inventive freeze-crusting process. The freeze-crusting process preferably comprises the steps of (a) continuously delivering food products through the freezing apparatus and (b) exposing the food products to cold circulating air within the freezing apparatus in a manner effective for freezing an outermost layer of the food product. The inventive crusting process is particularly well-suited for preparing food logs and other products for slicing.

14 Claims, 5 Drawing Sheets

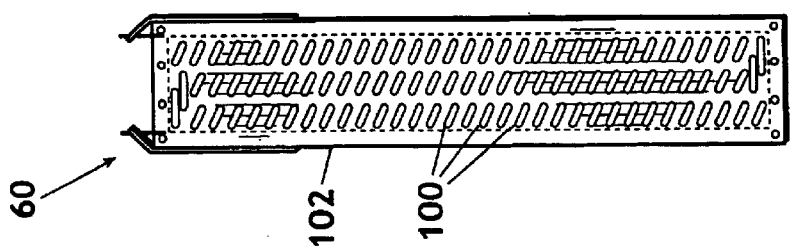
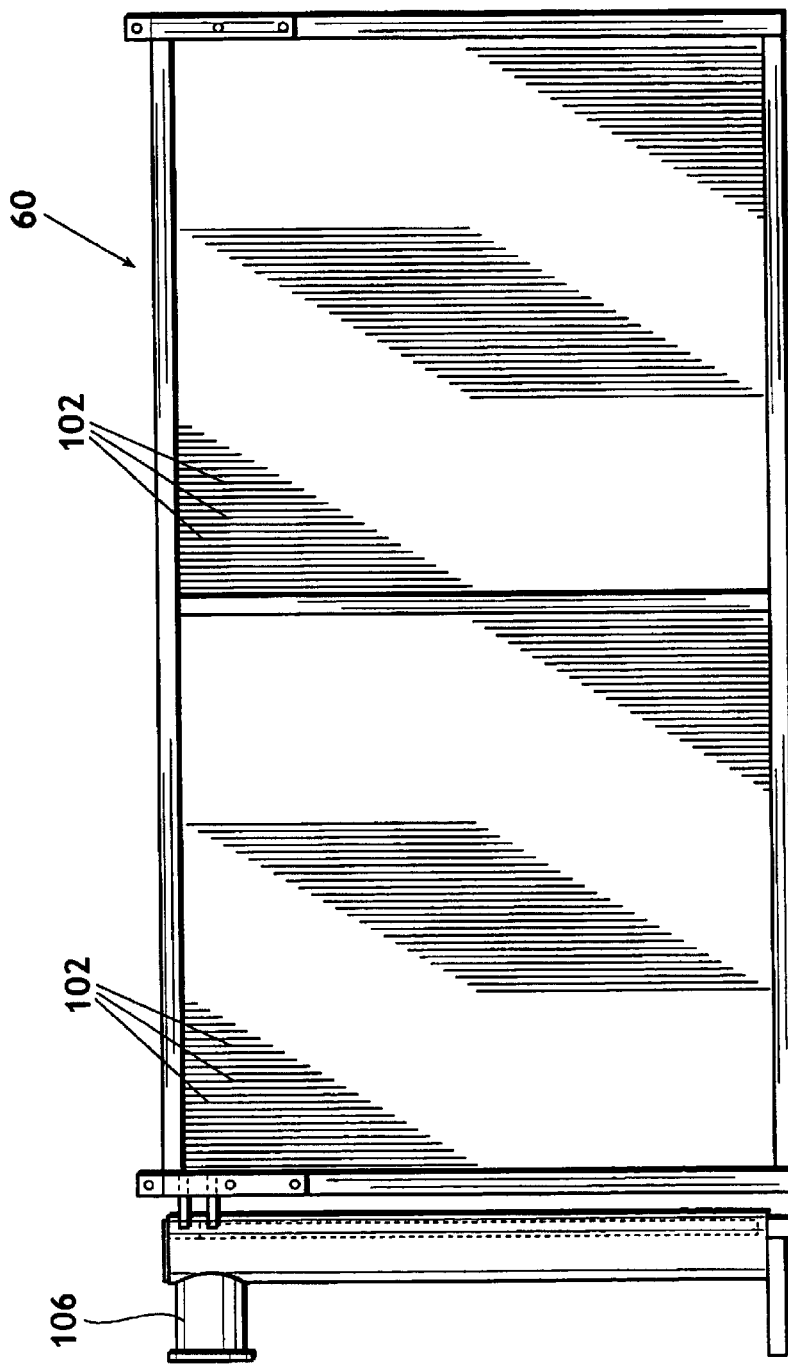

FREEZE-CRUSTING PROCESS AND APPARATUS

FIELD OF THE INVENTION

The present invention relates to processes and apparatuses for forming a frozen crust at the surface of a food product and to crusted products produced by such process and apparatus.

BACKGROUND OF THE INVENTION

Prior to slicing food logs (e.g., turkey logs, ham logs, honey-baked ham logs, etc.) and other food products, it is known in the art to first form a frozen crust at the surface of the product. The rigid crust greatly facilitates the slicing process by providing a much firmer surface for receiving the slicer blade. Additionally, the frozen outer edge of the sliced product prevents the individual slices from folding over as they fall from the cutting machine. The slices are therefore much better suited for forming stacks and for packaging.

Turkey, ham, and other food product logs typically have square, D-shaped, or oval cross-sectional shapes and can be up to 60 inches in length or more. The sliced product produced from such logs will commonly be packaged and provided to retail outlets as, for example, 4 inch×6 inch slices or 4 inch×4 inch slices.

By providing a firm outer surface for receiving the slicer blade, the frozen crust greatly reduces the production of slivers or partial slices that are otherwise formed when slicing a soft log. The frozen crust therefore allows much more efficient slicing, even at greatly accelerated slicing rates. For example, a line running an uncrusted product at 400 rpm can typically be accelerated to 800, 1000, or even 1200 rpm when slicing a crusted product.

Two types of freezing processes have heretofore been used in the art. The first is a cryogenic crusting process wherein nitrogen, in either liquid or gas form, is applied to the surface of the product log for a period of from about 4 to about 12 minutes. Because of the extremely cold temperatures involved and the relatively brief period of exposure, nitrogen processes provide a highly desirable, thin product crust. The other process employed heretofore involves simply loading a large number of product logs onto a truck and placing the loaded truck in a batch freezer for 8–10 hours.

Unfortunately, each of the two prior crusting processes has significant shortcomings. The total operating cost of a nitrogen crusting process will typically be as much as about three cents or more per pound of product. In the batch freezing process, on the other hand, each truck holds about 50 logs so that, after removing the truck from the freezer, it takes approximately one hour to slice the entire batch. Thus, toward the end of the hour-long batch slicing process, the remaining product logs will be significantly or completely thawed. Additionally, such batch freezing processes are so slow that the crust formed is very thick and the temperature reduction experienced reaches all the way to the core of the product. A thick crust of this type can dull the product slicer blade very quickly.

SUMMARY OF THE INVENTION

The present invention satisfies the needs and alleviates the problems discussed hereinabove. The present invention provides a continuous freeze-crusting process which is fast but costs a great deal less than nitrogen crusting processes. The inventive process preferably utilizes ammonia, Freon, or other common refrigerants costing as little as 0.1¢ per pound of product. In addition, the inventive system continuously provides freshly crusted product to the slicer, as needed, so that no significant thawing of the crust occurs.

In one aspect, the present invention provides a process for freeze-crusting food products comprising the steps of: (a) continuously delivering the food products through a freezing apparatus and (b) exposing the food products to circulating air within the freezing apparatus at a temperature and in a manner effective for freezing an outermost layer of each food product.

In another aspect, the present invention provides a method of processing food products comprising the steps of: (a) continuously delivering the food products through a freezing apparatus; (b) exposing the food products to circulating air within the freezing apparatus having an average temperature of not greater than 0° F. and then (c) slicing the food products. In step (b), the circulating air is circulated in the freezing apparatus in a manner effective for freezing an outermost layer of the food product in less than 30 minutes. The frozen outermost layer will preferably have a thickness in the range of from about 0.1 to about 0.5 inches.

The present invention further provides a vertical freezing unit which is particularly well-suited for use in the inventive freeze-crusting process. The inventive freezer can also be used for other types of freezing operations. The inventive vertical freezer desirably operates by cold air circulation using ammonia, Freon, or other common refrigerants. In addition, the inventive vertical freezer inverts the product (i.e., turns the product over) during the crusting or freezing process so that a much more equivalent and thorough degree of air contact occurs with all surfaces of the product. Also, because of its vertical structure, the inventive freezer has a much smaller footprint and therefore requires much less space than other types of freezers known in the art.

The inventive vertical freezing apparatus preferably comprises: a housing; a vertical conveyor positioned in the housing and having an upward path and a downward path; a refrigerating element within the housing; and circulating means for circulating air within the housing through the refrigerating element and onto products carried by the vertical conveyor.

Further objects, features, and advantages of the present invention will be apparent to those skilled in the art upon examining the accompanying drawings and upon reading the following description of the preferred embodiments.

BRIEF DESCRIPTION OF THE DRAWINGS

FIG. 5 is an elevational front view of an evaporator 60 preferred for use in inventive freezer 20.

FIG. 6 is an elevational end view of evaporator 60.

DETAILED DESCRIPTION OF THE PREFERRED EMBODIMENTS

In the inventive process, an outermost layer of a food product is freeze-crusted by contacting with cold, circulating air. The cold air will preferably have an average temperature of less than 0° F. The cold air will more preferably have an average temperature of less than −10° F. and will most preferably have an average temperature of less than −15° F. Additionally, the cold air will preferably contact the product with a degree of convection, impingement, or other type of circulation sufficient to complete the crusting process in less than 30 minutes. The crusting process will more preferably be completed in less than 20 minutes and will most preferably be completed in less than 15 minutes.

As will be understood by those skilled in the art, various types of meat, poultry, fish, and vegetable products can be crusted in accordance with the inventive process. Examples include, but are not limited to, turkey logs, ham logs, bacon backs, processed beef logs, fish logs, luncheon meat logs, and spiral hams. Product logs freeze-crusted in accordance with the inventive process will typically be cooked products and will commonly have lengths of up to 40 inches or even up to 60 inches or more.

Figure 1:
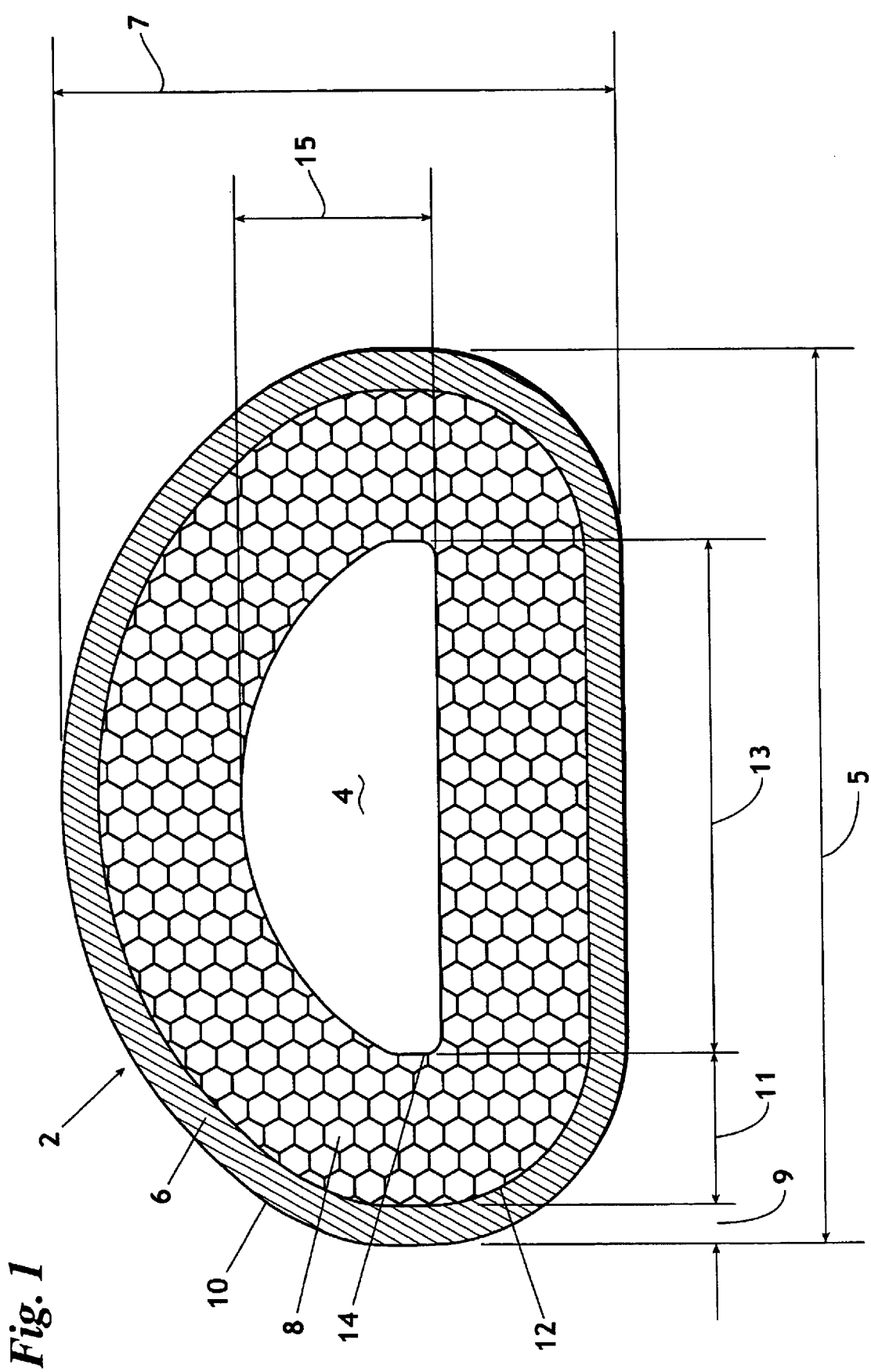
FIG. 1 schematically illustrates a cutaway elevational end view of a product log 2 which has been freeze-crusted in accordance with the inventive process.

A cross-section of a typical precooked, D-shaped product 2 (e.g., a turkey log) which has been freeze-crusted in accordance with the inventive process is depicted in FIG. 1. The freeze-crusted product log 2 comprises an inner core 4, an outer frozen crust layer 6, and a transition region 8 extending between core 4 and outer crust 6. For slicing purposes, the crust 6 formed in accordance with the inventive process will preferably have a thickness 10 in the range of from about 0.1 to about 0.5 inches and will most preferably have a thickness 10 of about 0.25 inches.

Prior to crusting, the temperature throughout product 2 will typically be in the range of from about 28° F. to about 38° F. However, if delivered directly from a surface pasteurizing process, for example, the log will typically still have a core temperature in the range of from about 28° F. to about 38° F. but may have a surface temperature in the range of from about 80° F. to 120° F.

As will be understood by those skilled in the art, meat, fish, and poultry products, such as meat, fish, or poultry logs, typically have freezing temperatures of less than 29° F. In most cases, the freezing temperature of a meat, fish, or poultry log will be in the range of from 27.5° F. to about 28.75° F.

By way of example, but not by way of limitation, assuming that the freeze-crusted product log 2 has a lateral width 5 of 5⅞ inches, a height 7 of 3⅞ inches and an outer crust thickness 9 of ¼ inch, the transition region 8 of the crusted product will typically have a thickness 11 of about 1 inch and the inner core 4 of the crusted product will typically have a lateral width 13 of about 3⅜ inches and a height 15 of about 1⅜ inches.

Regardless of the actual dimensions of product log 2, the cross-sectional temperature profile of the product will preferably be such that the temperature of the outer surface 10 of the crusted product is less than 25° F. and is most preferably about 20° F. However, when freeze-crusted in accordance with the inventive process, the temperature at the core 4 of the product will preferably not decrease to any significant degree and most preferably will not decrease at all.

Depending upon the type of product in question, the temperature at the border 12 between crust 6 and transition region 8 will typically be in the range of from about 26° F. to about 28° F.

Generally any type of continuous, circulating air freezer can be used in the inventive freeze-crusting process. As used herein and in the claims, the term "continuous" means that the freezer will be operable for continuously receiving and freeze-crusting the food product. The inventive vertical freezer 20 described hereinbelow is particularly well-suited for use in the inventive freeze-crusting process.

Examples of other types of continuous freezing systems suitable for use in the inventive process include, but are not limited to, spiral freezers, available from various manufacturers, and the linear Continuous Flow Impingement Chiller 30 available from Unitherm Food Systems, Inc., Ponca City, Okla. As compared to the preferred vertical freezer 20, a spiral freezer or a linear impingement chiller 30 will typically require a great deal more space. In addition, a spiral freezer typically will not provide as great a degree of cold air turbulence within the unit and will require substantially longer to complete the freeze-crusting process. Required residence times in a spiral freezer will typically be as much as from about 30 to about 45 minutes, thus resulting in the formation of a relatively thick crust. In addition, spiral freezers typically cannot handle products greater than 40 inches in length.

Figure 2:
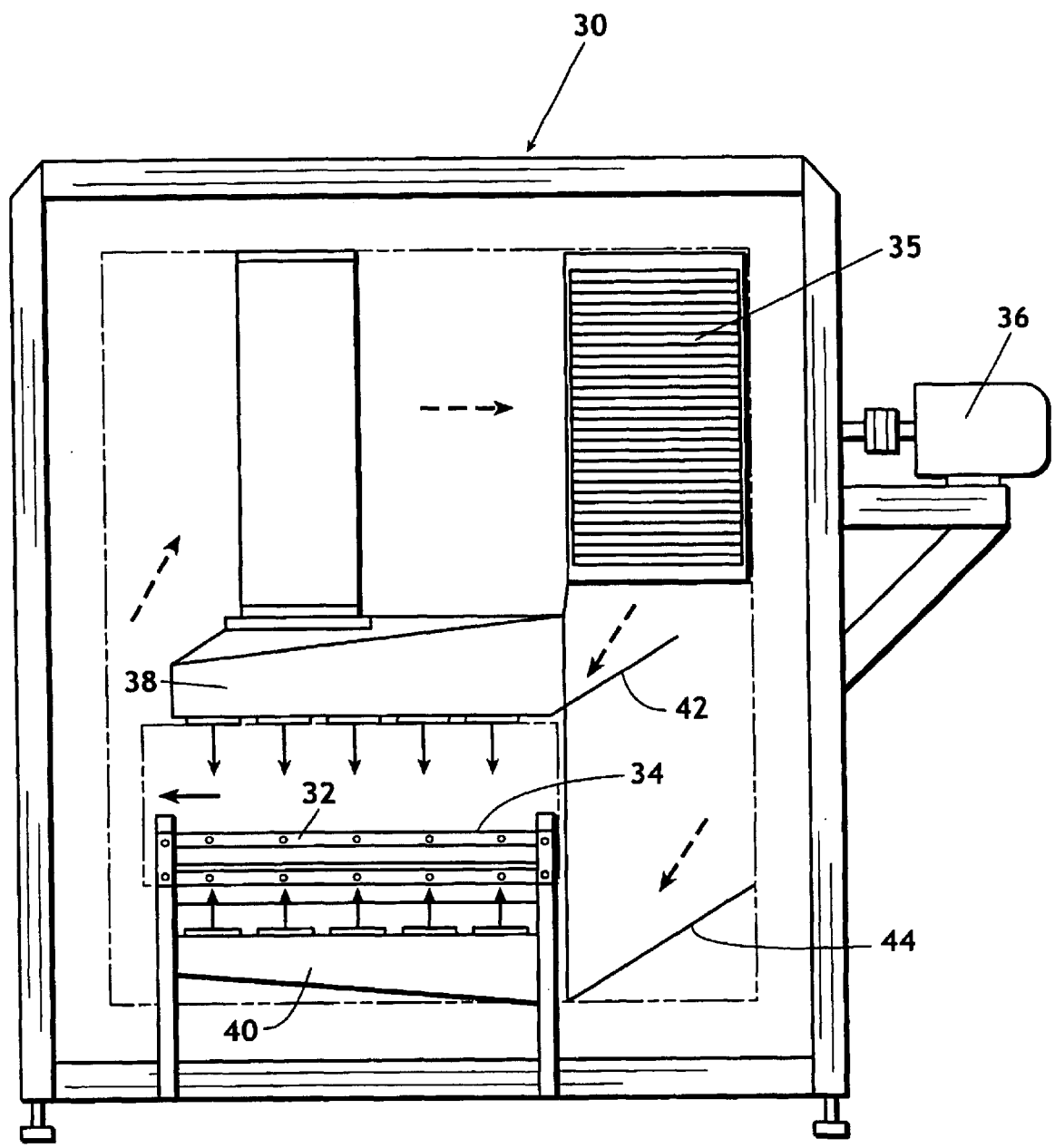
FIG. 2 provides a cutaway elevational inlet end view of an impingement chiller 30 which is well suited for use in the inventive process.

The Unitherm Linear Impingement Chiller 30 is illustrated in FIG. 2. Impingement chiller 30 comprises: a linear internal conveyor 32 having a perforated belt 34 (preferably formed of modular plastic or stainless steel); an internal refrigerating unit 35 typically including a refrigerant evaporator coil and one or more air circulation fans; external fan motors 36; an upper air delivery duct 38 positioned above conveyor 32. and having nozzles, orifices, or other impingement flow structures for delivering the chilled air downwardly onto the product; a similar lower duct 40 for delivering the chilled air upwardly onto the product through perforated belt 34; and internal air flow ducts, baffles, or panels 42 and 44 which direct the chilled air from the air chilling and circulation system 35 into the upper and lower ducts 38 and 40. Impingement chiller 30 will preferably be operated using a common refrigerant such as ammonia or Freon and, depending upon the particular refrigerant used, can provide chilled air temperatures in the range of from about −20° F. to about −40° F. or less. Average wind chill temperatures within the unit can be as low as −90° F. or less.

Figure 3:
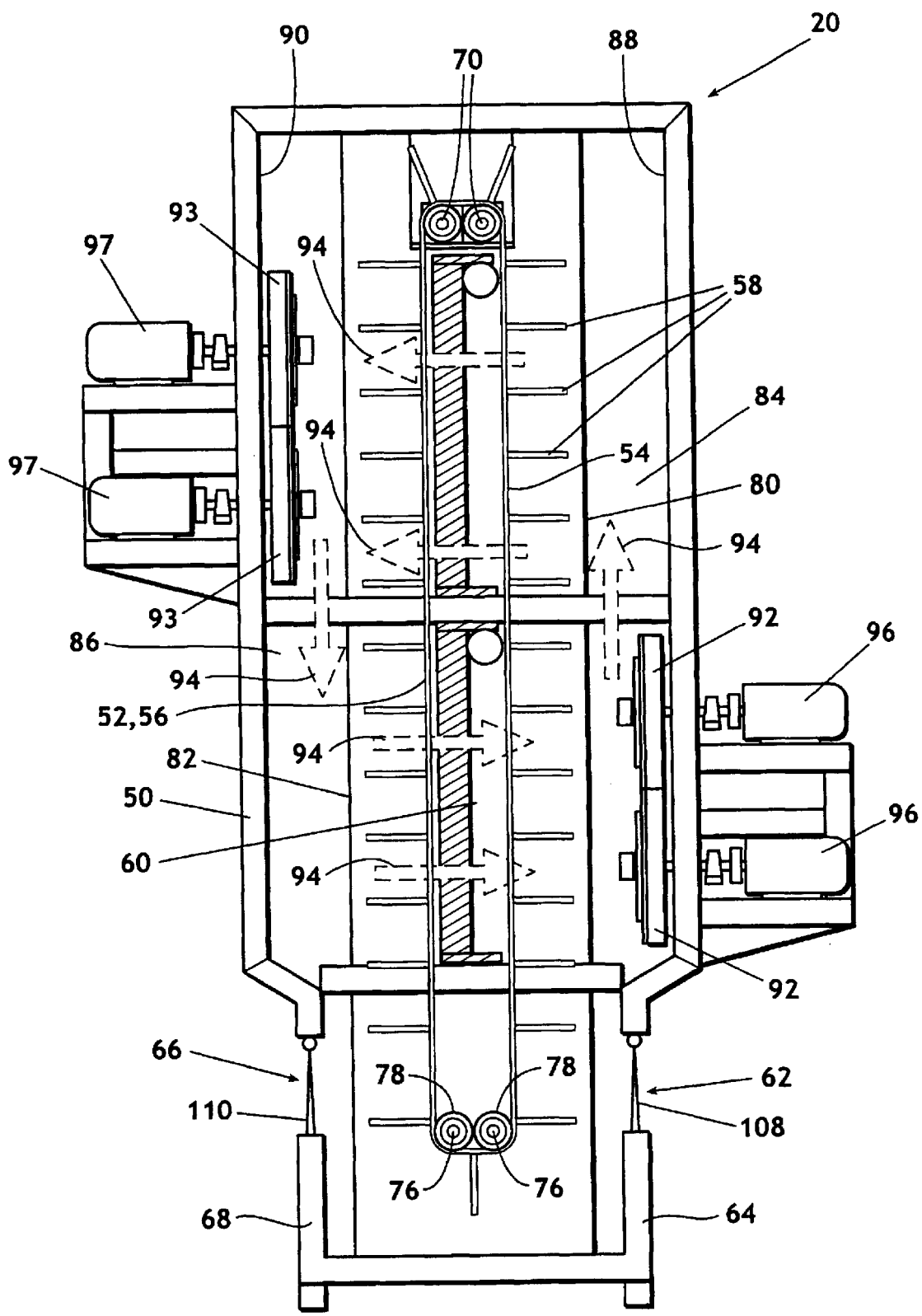
FIG. 3 is a cutaway elevational side view of an embodiment 20 of the vertical freezing apparatus provided by the present invention.
Figure 4:
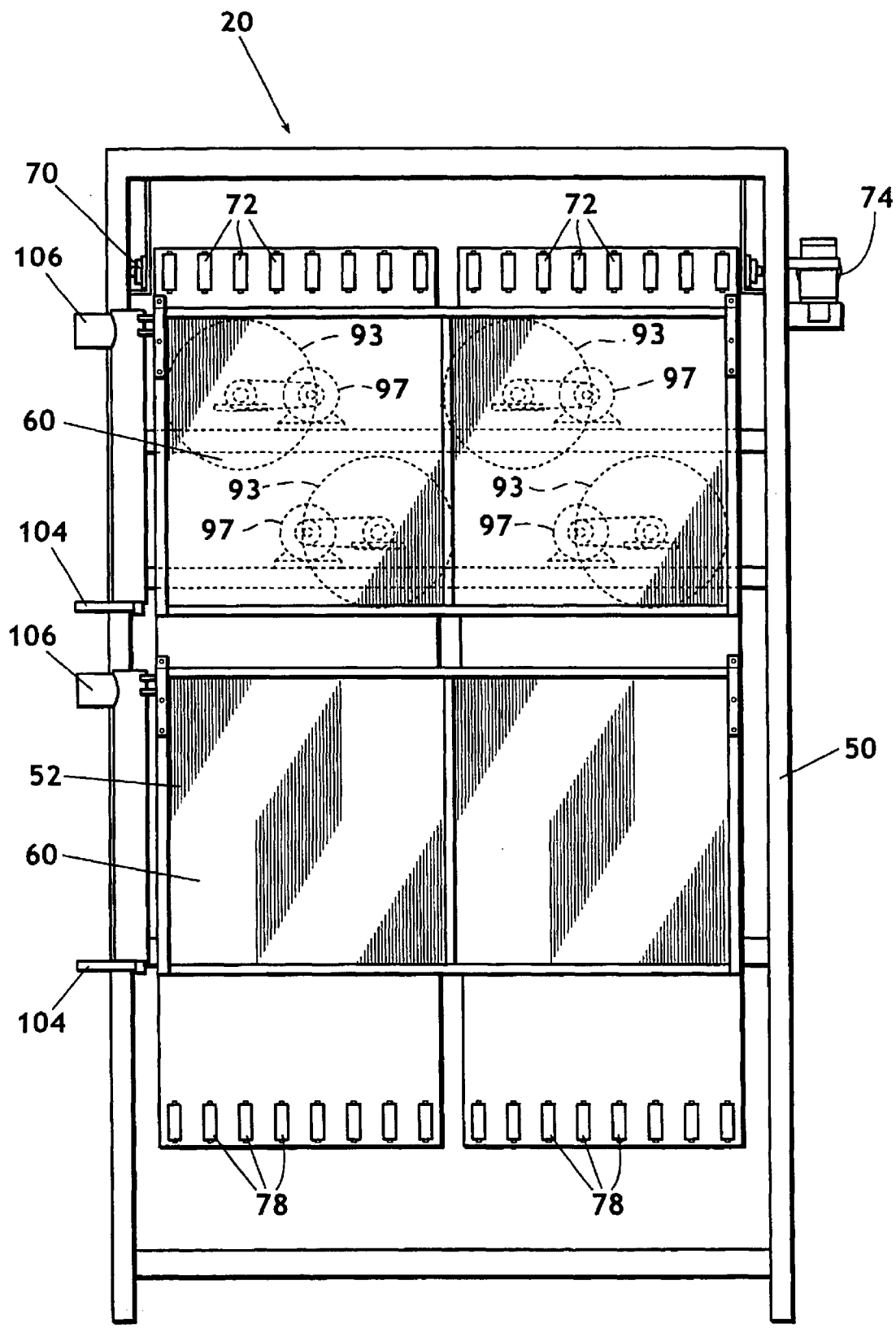
FIG. 4 is a cutaway elevational front view of inventive vertical freezer 20.

Embodiment 20 of the inventive vertical freezer is depicted in FIGS. 3 and 4. Vertical freezer 20 preferably comprises: an insulated housing 50; one or more internal vertical conveyors 52 rotatably installed in housing 50 and having an upward path 54 and a downward path 56; a plurality of outwardly extending, lateral carrier plates or flights 58 included on vertical conveyor(s) 52; a vertical refrigerating element (preferably an evaporator) 60, or a plurality of stacked elements 60, sandwiched between the upward and downward paths 54 and 56 of vertical conveyor(s) 52; an inlet opening 62 provided through the lower portion of the front wall 64 of housing 50; an outlet opening 66 provided in the bottom portion of the back wall 68 of housing 50; a pair of drive shafts 70, one preferably being directly driven and the other preferably being slave or belt driven, rotatably extending longitudinally through the upper portion of freezer housing 50 and having a plurality of sprockets 72 secured thereon for engaging and driving vertical conveyor(s) 52; a drive motor 74 secured outside of freezer housing 50 and having a drive shaft operably connected or linked to at least one of drive shafts 70; and a pair of idler shafts 76 rotatably extending longitudinally within the lower portion of the housing and having sprockets 78 secured thereto for engaging and guiding the lower end of vertical conveyor(s) 52.

Inventive vertical freezer 20 preferably also comprises: perforated, vertical interior front and back walls 80 and 82 which allow air flow but enclose the distal ends of carrier plates 58 to prevent product from falling off of the plates; vertical front and back plenums 84 and 86 defined respectively by the vertical spaces created between perforated interior panels 80 and 82 and the vertical interior front and back walls 88 and 90 of housing 50; a plurality of fans 92 positioned within the lower portion of front plenum 84; a plurality of additional fans 93 positioned within the upper portion of back plenum 86; a corresponding plurality of motors 96 and 97 mounted outside of housing 50 for driving fans 92 and 93; and a pair of flexible curtains 108 and 110, preferably plastic strip curtains of a type well-known in the art, positioned in inlet and outlet openings 62 and 66 of housing 50 which allow product to pass therethrough but reduce cold air losses from the inlet and outlet openings.

Fans 92 and 93 are preferably positioned to continuously circulate air through vertical conveyor(s) 52 and vertical cooling element(s) 60 in the manner indicated by flow cycle arrows 94.

As indicated above, inventive freezer 20 can employ a single vertical conveyor 52, which would extend across substantially the entire interior width of housing 50, or can employ two or more vertical conveyors positioned side-by-side. Vertical conveyor(s) 52 and the lateral carrier plates 58 extending therefrom are preferably perforated or of mesh construction to allow air flow laterally through refrigerating element(s) 60 and upwardly through carrier plates 58.

As will be understood by those skilled in the art, various types of refrigerating elements could be used in the inventive freezer 20. A refrigerating element 60 of a type particularly preferred for use in inventive freezer 20 is depicted in FIGS. 5 and 6. Refrigerating element 60 is an evaporative coil-type element comprising coolant coils 100, which loop back and forth horizontally, and a plurality of closely spaced, laterally oriented, vertical fins 102 through which coils 100 are received and retained.

Generally any common freezer refrigerant can be employed in inventive freezer 20. The coolant will preferably be either ammonia or Freon and will most preferably be ammonia. The coolant is circulated through vertical refrigerating element 60 via a lower conduit 104 which delivers cold liquid refrigerant into the bottom of cooling element 60 and a larger upper conduit 106 which receives the warmer, at least partially vaporized, return coolant from the upper end of refrigerating element 60. The return coolant is delivered through a typical external compression and heat removal system (not shown) and then recirculated through refrigerating element 60.

Although numerous alternative types of fan systems can be used, the internal air circulation fans 92 and 93 employed in inventive freezer 20 will preferably be flat-bladed, plug fans. Each fan pulls air in along its horizontal axis of rotation and then forces the air radially outward within plenum 84 or 86. As shown in FIG. 3, fans 92 are preferably positioned in the lower portion of front plenum 84 and fans 93 are positioned in the upper portion of back plenum 86 such that the fans circulate cold air in a continuous cycle upwardly in front plenum 84, then laterally rearward toward back plenum 86 such that the air passes through the upper refrigerating element 60, then downward through back plenum 86, and then forward toward front plenum 84 such that the air again passes through the lower refrigerating element 60.

As will be understood by those skilled in the art, air flow rates, air temperatures, and resulting wind chill factors within inventive freezer 20 can be varied and controlled by, for example, using either variable speed fan motors or constant speed motors equipped with inverters. A variable speed conveyor motor 74 can also be used to adjust and control the residence time of the product in freezer 20.

Fans 92 and 93 will preferably be sized and operated to provide an air flow velocity through refrigerating element(s) 60 in the range of from about 1000 to about 8000 feet per minute. The air flow velocity established through refrigerating element(s) 60 will most preferably be about 2,000 feet per minute.

During the inventive freeze-crusting process, the average air temperature within inventive freezer 20 will preferably be less than 0° F. and will more preferably be in the range of from about −10° F. to about −50° F. If an ammonia or Freon coolant is employed in inventive freezer 2, the temperature therein during the crusting operation will typically be in the range of from about −15° F. to about −40° F.

In addition, air circulation rates within inventive freezer 20 will preferably be controlled such that the average wind chill temperature experienced by each product as it is conveyed up and down within inventive freezer 20 will be less than −25° F. and will more preferably be less than about −45° F. The average wind chill temperature experienced by the product during the inventive freeze-crusting operation will typically be in the range of from about −55° F. to about −90° F.

When using vertical freezer 20 in accordance with the inventive freeze-crusting process, the product can be delivered into freezer inlet opening 62 and onto conveyor carrier plates 58 using, for example, a gravity feed chute. As mentioned above, the product (e.g., product 2 depicted in FIG. 1) will typically be in the form of logs having lengths of up to 40 inches or even up to 60 inches or more. As will be understood by those skilled in the art, the product logs can be pushed down the gravity chute, one after another, such that the individual logs are forced through the inlet curtain 98 and on to the upwardly moving carrier plates 58 of vertical conveyor(s) 52. The outer surface 10 of the product is contacted by cold circulating air as it travels along upward path 54. At the top of upward path 54, the vertical conveyor(s) 52 turn on drive shafts 70 to begin their downward path 56. As products 2 are carried around the turn at the top of vertical conveyor(s) 52, the products are desirably inverted (i.e., turned over) such that the bottom surface of the product becomes the top surface of the product while traveling in downward path 56. Circulating cold air contact with the products continues as they move down downward path 56.

Inverting the product in this manner at the mid-point of the freeze-crusting operation ensures that the entire surface 10 of the product is subjected to a much more thorough and equivalent degree of air contact than would otherwise occur if the product remained in the same position throughout the entire freeze-crusting operation.

As the crusted products reach the bottom of downward path 56, the products can simply slide onto a product conveyor as the carrier plates begin the turn around the lower idler shafts 76.

The crusted product will preferably be continuously delivered directly from vertical freezer 20, or from any other alternative freezer employed in the inventive process, to a slicing machine. Various types of suitable slicing machines are well-known in the art. Suitable machines for slicing log-type products are available, for example, from Formax, Inc., Mokena, Ill.; Weber, Inc., Kansas City, Mo.; A.E.W.-Thurne, Inc., Lake Zurich, Ill.; and other manufacturers.

In a particularly preferred embodiment, all of the interior walls, conveyors, and carrier plates of inventive vertical freezer 20 will preferably be formed of stainless steel so that they can be easily sterilized by heating the interior of freezer 20 to 160° F. Although inventive vertical freezer 20 has been described as used in the inventive freeze-crusting process, it will be apparent that freezer 20 can be used in generally any type of freezing process.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for continuously at least crust freezing food product items comprising:

a housing;

at least one vertical conveyor positioned in said housing in a manner such that said vertical conveyor will, without stopping and without transferring to any other conveyor device, continuously carry at least a portion of said food product items along both an upward path and a downward path in said housing;

a refrigerating element within said housing, said refrigerating element being positioned between said upward and said downward paths of said vertical conveyor; and circulating means for circulating air within said housing through said refrigerating element and onto said portion of said food product items as said portion of said food product items are carried by said vertical conveyor.

2. The apparatus of claim 1 wherein said vertical conveyor includes apertures for allowing said circulating air to flow through said vertical conveyor.

3. The apparatus of claim 1 wherein said vertical conveyor includes a plurality of lateral carrier plates or flights for carrying said portion of said food product items along said upward and said downward paths.

4. The apparatus of claim 1 wherein said circulating means comprises a plurality of fans within said housing.

5. The apparatus of claim 1 wherein said vertical conveyor is effective for inverting said food product items as said vertical conveyor moves said portion of said food product items from said upward path to said downward path.

6. The apparatus of claim 1 wherein said refrigerating element is an evaporator effective for cooling said air using ammonia or Freon.

7. An apparatus for continuously at least partially freezing elongate food product logs with chilled air comprising:

a housing and at least one conveyor positioned in said housing such that said one conveyor will continuously receive at least a portion of said elongate food product logs and continuously carry said portion of said elongate food product logs, without transferring said portion of said food product logs to any other conveyor device, along both a substantially vertical upward path and a substantial vertical downward path, wherein said one conveyor will carry said portion of said elongate food product logs in a manner effective for contacting said portion of said elongate food product logs with said chilled air as said portion of said food product logs travel along said upward path and said downward path such that at least an outermost layer of each one of said portion of said elongate food product logs will be frozen by said chilled air, wherein said outermost layer extends around the entire cross-sectional periphery of said one of said elongate food product logs, said outermost layer has a thickness in the range of from about 0.1 to about 0.5 inches, and said apparatus is effective for freezing said outermost layer with said chilled air in not more than 30 minutes.

8. The apparatus of claim 7 wherein: each one of said elongate food product logs has an internal core and said apparatus is effective for freezing said outermost layer substantially without causing a temperature decrease in said core.

9. The apparatus of claim 7 wherein said conveyor includes a plurality of lateral carrier plates or flights for receiving and carrying said portion of said elongate food product logs along said upward path and said downward path.

10. The apparatus of claim 7 wherein said conveyor is effective for inverting each one of said portion of said elongate food product logs as said conveyor moves said portion of said elongate food product logs from said upward path to said downward path.

11. An apparatus for continuously at least crust freeing food product items comprising:

a housing;

at least one vertical conveyor positioned in said housing in a manner such that said vertical conveyor will without stopping and without transferring to any other conveyor device, continuously carry at least a portion of said food product items along both an upward path and a downward path in said housing;

a refrigerating element within said housing; and circulating means for circulating air within said housing through said refrigerating element and onto said portion of said food product items as said portion of said food product items are carried by said vertical conveyor, wherein said food product items are cooked elongate food logs selected from the soup consisting of meat logs, poultry logs, and fish logs, said apparatus is effective for freezing an outermost layer of each one of said elongate food logs with said circulating air in not more than 30 minutes, and said outermost layer has a thickness in the range of from about 0.1 to about 0.5 inches and extends around the entire cross-sectional periphery of said one of said elongate food logs.

12. The apparatus of claim 11 wherein:

each of said elongate food logs has an internal core and said apparatus is effective for freezing said outermost layer substantially without causing a temperature decrease in said core.

13. An apparatus for continuously at least partially freezing elongate food product logs with chilled air comprising:

a housing;

at least one conveyor positioned in said housing such that said one conveyor will continuously receive at least a portion of said elongate food product logs and continuously carry said portion of said elongate food product logs, without transferring said portion of said food product logs to any other conveyor device, along both a substantially vertical path and a substantially vertical downward path; and a refrigerating element positioned between said upward and said downward paths of said conveyor, wherein said one conveyor will carry said portion of said elongate food product logs in a manner effective for contacting said portion of said elongate food product logs wit said chilled air as said portion of said food product logs travel along said upward path and said downward path such that at least an outermost layer of each one of said portion of said elongate food product logs will be frozen by said chilled air.

14. The apparatus of claim 13 wherein said refrigerating element is effective for producing said chilled air using ammonia or Freon.

* * * * *